Oct. 6, 1942.   R. W. DINZL   2,298,044
MOLDING MACHINE
Filed July 31, 1940   2 Sheets-Sheet 1
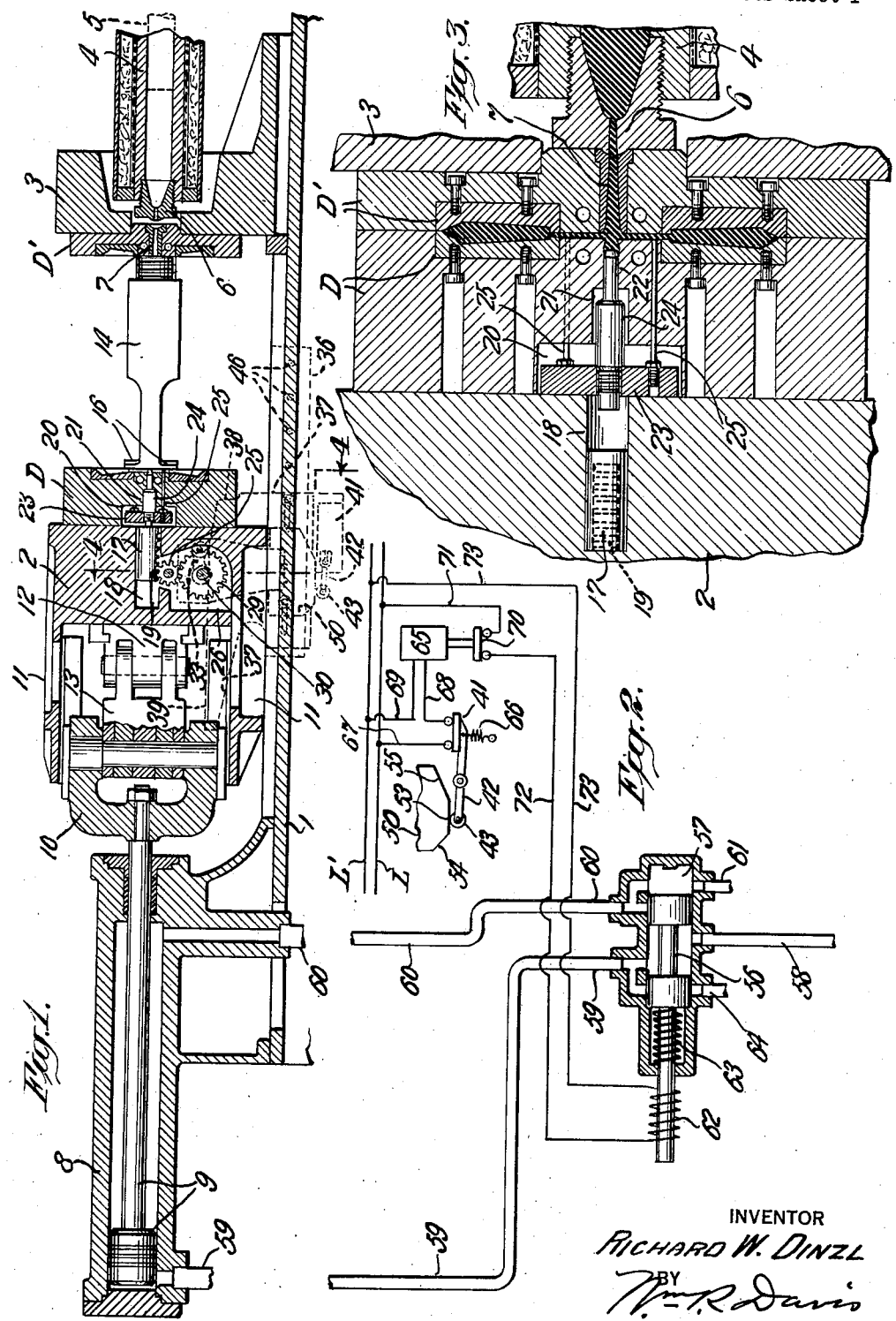
INVENTOR
RICHARD W. DINZL
BY
Wm. R. Davis
ATTORNEY Oct. 6, 1942.  R. W. DINZL  2,298,044
MOLDING MACHINE
Filed July 31, 1940  2 Sheets-Sheet 2
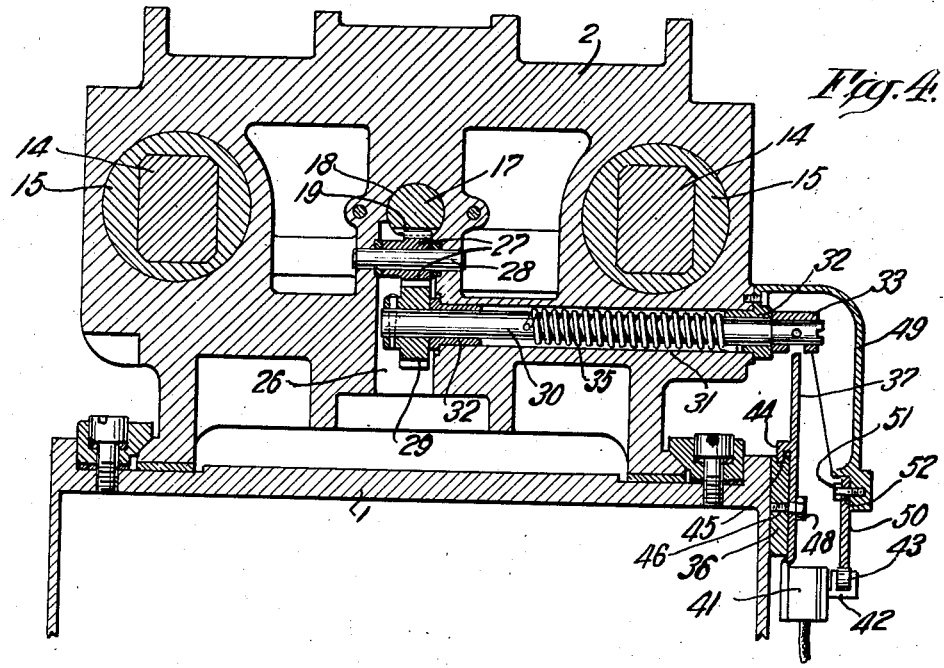
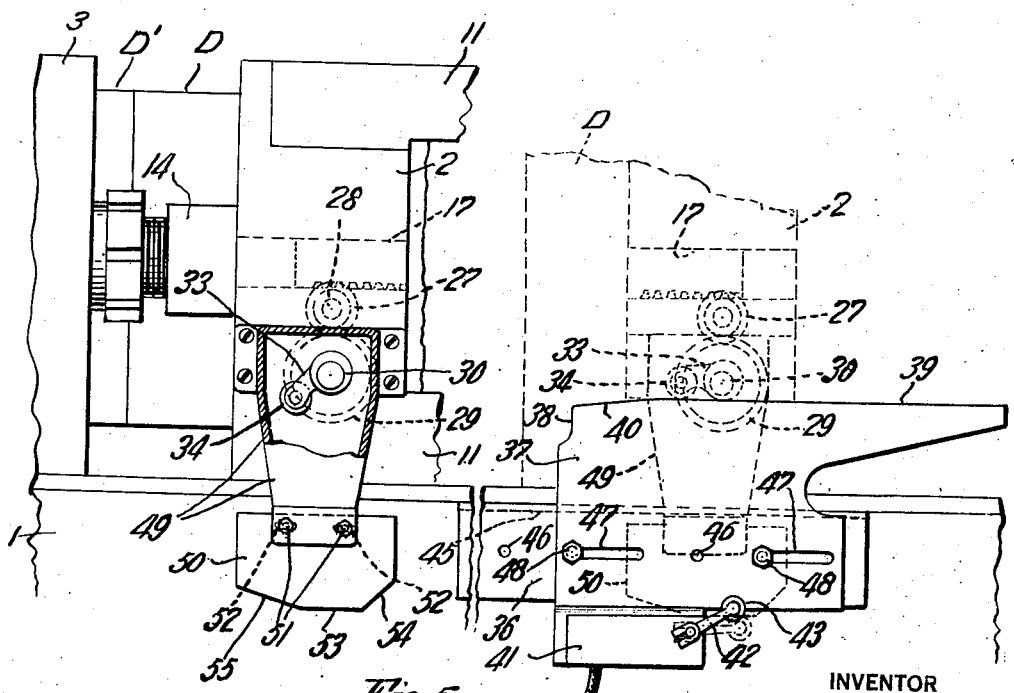
INVENTOR
RICHARD W. DINZL
BY
ATTORNEY Patented Oct. 6, 1942

2,298,044

UNITED STATES PATENT OFFICE 2,298,044

MOLDING MACHINE

Richard W. Dinzl, Westfield, N. J., assignor to The Watson-Stillman Co., Roselle, N. J., a corporation of New Jersey Application July 31, 1940, Serial No. 348,619

7 Claims. (Cl. 18—16)

An important object of the present invention is to provide improved means for adjusting the stroke length of a platen and for timing the operation of an ejector mechanism with relation to the stroke adjustment in a molding machine having a platen shiftable toward and from a companion platen to close and open a mold and eject the molded product.

Other objects of the invention will appear hereinafter.

In the drawings,

Fig. 1 is a longitudinal sectional view of a portion of an injection molding machine embodying the invention;

Fig. 2 is a diagrammatic view of part of a control system for the machine;

Fig. 3 is a horizontal section taken centrally through the platens and dies of the machine, with the dies in closed relation, and showing part of the mechanism for ejecting castings;

Fig. 4 is an enlarged vertical cross section approximately on the line 4—4 of Fig. 1; and Fig. 5 is a sectional side elevation of a portion of the machine showing the means for controlling the stroke length of the shiftable platen and the operation of the ejector mechanism.

The invention is shown as embodied in an injection molding machine of the type disclosed in a copending patent application of Edward R. Knowles, Serial No. 204,122 filed April 20, 1938. The machine includes a base 1 upon which are mounted two opposed platens 2 and 3. Platen 2 bears a die or mold section D and platen 3 bears a companion die or mold section D'. Associated with platen 3, and supported in a fixed position, by means not shown, there is a heating cylinder 4 for thermoplastic material to be molded. An injection plunger 5, indicated by dotted lines, is reciprocable within the cylinder, and the cylinder has an injection nozzle 6 at its forward end to discharge into a mold-charging port or gate 7 of the die D'. Platen 3 is mounted for limited reciprocation sufficient only to make and break contact between said nozzle and mold gate. Platen 2 is mounted for more extended reciprocation to close and open the mold by moving the die D toward and from the die D'.

For reciprocation of the platen 2 there is a hydraulically operated mechanism including a cylinder 8 mounted upon the base in horizontal alinement with the centers of the platens. A ram 9 is reciprocable within the cylinder and has its forward end operatively connected to a yoke 10. The latter is mounted to slide between guide extensions 11 borne by the platen 2. Locking wedges or bolts are mounted upon the rear face of platen 2 for sliding transversely of the direction of movement of the platen. One of these bolts is shown at 12 in Fig. 1. The yoke is operatively connected to the joint of a toggle 13 whose opposite ends are operatively connected to said bolts. Platen 3 has parallel resistance rods 14 anchored thereto and extending through bushings 15 borne by platen 2. At intermediate points in their length said rods have keeper abutments 16 located so that the locking bolts can engage them when the platen 2 has been advanced along the rods sufficiently to bring the die D only a short distance from the die D'. During said preliminary advance the outer ends of the locking bolts ride along the strain rods and the toggle is thereby prevented from expanding under the thrust of the ram 9. Consequently the yoke, the toggle, the locking bolts and the platen 2 will advance at the same rate as the ram until the bolts are brought opposite the keeper abutments 16. Then the ram can advance the yoke 10 relatively to the platen 2 and project the bolts into engagement with the keeper abutments. The bolts and keeper abutments are formed for wedging coaction to complete the advance of the platen 2 and finally lock it in a position to hold the die D pressed against the die D'. The mold is thus closed and locked in preparation for receiving an injection charge from the cylinder 4. Upon retraction of the ram the toggle causes retraction of the bolts from the keeper abutments and then the yoke, the toggle, the locking bolts, the platen 2 and the die D are drawn back as a unit by the ram to open the mold. The locking mechanism is not illustrated in detail in this application but is fully disclosed in the aforesaid copending application.

In order to save power and also save time in the operation of the machine, it is desirable to limit the retraction of the platen 2 from the platen 3 to a distance just sufficient for free ejection of the casting or castings from the opened mold. That distance will, of course, vary with dies of different thicknesses and castings of different sizes and shapes. The present invention is directed primarily to a more convenient adjustment of both the stroke of the platen 2 and the timing of the ejection in accordance with the stroke adjustment.

There is provided an ejector mechanism including a plunger 17 mounted for horizontal reciprocation in a central bore 18 in the platen and having rack teeth 19 at its under side. Bore 18 opens into a recess 20 in the adjacent face of the die D, and the die has a bore 21 leading forward from said recess and having a reduced portion 22 opening through the forward face of the die. A block 23 is reciprocable within the said recess and bears a central knock-out pin 24 protruding into the bore 21 and having a reduced forward portion projecting into the reduced portion 22 of the bore. Smaller knock-out pins 25 are also borne by the block in positions spaced outwardly from the central pin and extend forwardly through bores in the die D. The length of all of the knock-out pins is such that when the block is back against the face of the platen the forward ends of the pins will be inward of the forward face of the die. The central pin also protrudes rearward from the block into the bore 18 so that when the plunger 17 is advanced it will strike said pin and shift the block and all of the pins forwardly to knock castings from the die.

Below the bore 18 the platen 2 has a recess 26 in which there is an idler pinion 27 borne by a shaft 28 mounted in opposite walls of the recess. Said pinion meshes with the teeth of the ejector plunger 17. A driving gear 29, also within said recess, meshes with pinion 27 and is fixed to a transverse rock shaft 30. The latter extends through a bore 31 in the platen and protrudes from an outer side face of the platen. Bushings 32 fitted within opposite ends of bore 31 provide bearings for the shaft. A crank arm 33 is affixed to the outer end of the shaft and bears a roller 34. Between the bushings 32 a torsion spring 35 encircles the shaft and has one end secured to the shaft and the other end secured to one of the bushings. This spring constantly urges the shaft rotatively to swing the crank arm counterclockwise, with reference to Fig. 5, and retract the plunger 17 from the knock-out means. A blank forward portion of the rack of said plunger, by engagement with the pinion 27, limits retraction of the plunger.

Secured to an outer side face of the base 1 of the machine there is an elongated plate 36 disposed lengthwise of the travel of the platen 2. Mounted upon said plate there is a cam plate 37 having an abrupt cam edge 38 directed toward the platen 3, a horizontal upper track edge 39 of material length and a sloping upper cam edge 40 leading from said abrupt edge to said track edge. Said cam edges 38 and 40 are disposed within the path of movement of the roller 34 on the crank arm 33 as the platen 2 is reciprocated. The cam plate has a lower margin extending below the plate 36 and upon said margin there is secured a stroke-control switch 41. Said switch has an operating crank arm 42 bearing a roller 43. The cam plate is slidably adjustable along the plate 36 and has a guide flange 44 slidably fitting in a groove 45 in the upper edge of plate 36. For securing the cam plate in different adjustments the plate 36 is provided with a row of screw-threaded holes 46 and the cam plate is provided with spaced slots 47 to aline with said holes. Headed clamping screws 48 are passed through said slots and screwed into selected ones of the holes to hold the plate in an adjusted position. The spacing of the holes provides for approximate preliminary adjustment of the cam plate, and the slots provide for accurate final adjustment.

Secured to the platen 2, at the same side of the machine as the cam plate 37, there is a bracket 49 in the form of a shield extending downward over the outer end of shaft 30 and its crank arm 33. A cam plate 50 is secured in a vertical plane to the lower margin of the bracket by means of headed screws 51. These are passed through slots 52 in the plate 50 and screwed into said margin. The slots enable adjustment of the plate in the bracket. Said plate has a straight, horizontal lower edge 53 and edges 54 and 55 sloping upward and outward from edge 53. This cam plate is disposed for operation upon the roller 43 of the switch crank 42 as the platen 2 is moved.

The stroke-limiting switch 41 is part of a control system for the ram 9. A conventional control system is shown diagrammatically in Fig. 2. It includes a double-headed piston valve 56 reciprocable within a casing bore 57. When said valve is in its left-hand position, with reference to Fig. 2, it opens communication between a hydraulic pressure supply pipe 58 and a pipe 59 leading to the outer end of cylinder 8. At the same time the valve opens communication between a pipe 60, leading from the inner end of cylinder 8, and an exhaust pipe 61. The ram is then advanced to close and lock the mold. The valve is moved to said position by energization of a solenoid 62 against the resistance of a spring 63. When the solenoid is de-energized said spring forces the valve to a right-hand position. There it admits hydraulic pressure from the supply pipe 58 to the pipe 60 and the inner end of cylinder 8 and relieves pressure from the outer end of the cylinder through pipe 59 and an exhaust pipe 64.

Switch 41 and a timer 65 control energization and de-energization of the solenoid 62 and said switch is in turn subject to control by the platen 2 acting upon the switch through the cam plate 50. A spring 66 urges switch 41 to open position in which position the roller 43 is in the path of cam 50. When, however, the platen 2 is retracted to open the mold the cam edge 54 acts upon the roller 43 to swing the arm 42 and close the switch 41. A circuit is thereby established including a line wire L, a conductor 67, a conductor 68, the timer 65, a conductor 69 and line wire L'. Thereby the timer is put into action to close a switch 70. Said switch closes a circuit for the solenoid 62 including line wire L, a conductor 71, a conductor 72 and a conductor 73. Thereby the solenoid is energized and shifts valve 56 to its left-hand position to cause advance of the ram to close and lock the mold. The timer holds the solenoid circuit closed for a suitable period and then shifts switch 70 to break the circuit. Spring 63 then shifts valve 56 to its opposite position for retraction of the cam to open the mold. Retraction of the platen 2 causes the cam 50 to close switch 41 and cause another cycle of operation.

As the platen 2 is retracted it not only causes operation of the switch 41 to limit the stroke but also causes operation of the ejector mechanism to strip the castings from the die D. As the platen is moved back the roller 34 of the ejector mechanism, traveling with the platen, engages first the edge 38 and next the edge 40 of cam 37 to thereby rock the crank arm 33 and the shaft 30 to operate the gearing, the plunger 17 and the knockout-pins to cause ejection of the castings. The parts are so related that the ejection will occur just before the platen 2 comes to a stop.

The ejector-controlling cam 37 and the stroke-controlling switch 41 are embodied in a unit. By merely adjusting this unit along the fixed plate 36, as previously described, the stroke length of the platen 2 may be varied by varying the point at which the cam 50, borne by the platen, will engage and operate the stroke-control switch 41. At the same time such adjustment of the unit automatically accommodates the operation of the ejector mechanism to the stroke adjustment since the ejector-operating cam 37 is adjusted along with the stroke-control switch 41.

What I claim is:

1. In a molding machine, the combination of two die-supporting platens, one of said platens being shiftably mounted, power means for advancing the shiftable platen toward and retracting it from the other platen, an ejector device and operating means for said device, a unit comprising a body, a cam borne by said body in a fixed position thereon and an electric switch for control of said power means also borne by said body and secured in a fixed position thereon and including a shiftable operating member; a fixed support for said unit supporting the latter for adjustment along the line of said platen advance and retraction and having a row of apertures extending along said line; fastening means selectively engageable with said apertures for approximate adjustment and securement of the unit at different positions along said line, the adjustment of the unit adjusting said cam and switch in unison and to the same degree along said line; means rendering said unit adjustable along said line relatively to said fastening means for finer adjustment of the unit; and a trip mounted to travel with said shiftable platen, said ejector-operating means being engageable with said cam of the unit and operable thereby, upon said platen retraction, to cause ejection of a casting from a die supported by one of said platens, said trip being engageable with said switch-operating member to operate the switch upon said platen retraction, for limiting retraction, and the adjustment of said unit determining said limit and timing the occurrence of said ejection.

2. In a molding machine, the combination of two die-supporting platens one mounted for shifting toward and retraction from the other, power means for advancing and retracting said shiftable platen, an ejector device, operating means for said device, a unit comprising a support, a power control means and a trip carried by said support and secured against displacement relatively to each other in the direction of said platen advance and retraction, means for adjusting and securing said unit at any one of a plurality of selected positions along the line of said platen advance and retraction to thereby shift said power control means and trip along said line in unison and to the same extent while maintaining them in their fixed positions with relation to each other, and a second trip mounted to travel with said shiftable platen, said ejector-operating means being engageable with said first mentioned trip and operable thereby upon said platen retraction to a predetermined point to cause ejection of a casting from a die supported by one of the said platens, said second trip being engageable with said power control means to operate the latter upon a predetermined limit of said platen retraction and thereby limit the said platen stroke, and the adjustment of said unit determining said limit of retraction and timing the occurrence of said ejection, whereby the timed relation of the platen stroke limit and the ejection operation will be maintained in all adjustments of the said unit.

3. In a molding machine, the combination of two die-supporting platens one mounted for shifting toward and retraction from the other, power means for advancing and retracting said shiftable platen, ejector means mounted to travel with said shiftable platen, a rockable operating device for said ejector means also mounted to travel with said shiftable platen, a unit comprising a support carrying a cam and a power control means secured to the support against displacement relatively to the cam in the direction of said platen advance and retraction, said power control means including a rockable operating device therefor, means to adjust and secure said unit at any one of a plurality of selected positions along the line of said platen travel to thereby shift said cam and power control means along said line in unison and to the same extent, and a second cam mounted to travel with said shiftable platen and operate said rockable power control device by platen retraction to a predetermined point to limit the said retraction, said rockable ejector-operating device being operable by said first mentioned cam of the unit by platen retraction to a predetermined point to cause ejection of a casting from a die supported by one of the platens, and the adjustment of said unit timing the occurrence of said ejection and determining the limit of said retraction.

4. In a molding machine, the combination of two die-supporting platens one mounted for shifting toward and retraction from the other, power means for advancing and retracting said shiftable platen, an ejector mounted to travel with said shiftable platen, mechanism for operating said ejector borne by said shiftable platen and comprising a plunger advanceable to shift the ejector to operative position, a rock shaft, gearing operatively connecting said shaft to the plunger to reciprocate the latter by rocking the shaft, a crank arm borne by said shaft and spring means constantly urging the shaft for retraction of the plunger; a unit comprising a support, a cam and a power control means secured to said support against displacement relatively to each other in the direction of the said platen advance and retraction, said power control means including a rockable operating device therefor; means to adjust and secure said unit at any one of a plurality of selected positions along the line of said platen travel to thereby adjust said cam and power control means along said line in unison and to the same extent, and a cam mounted to travel with said shiftable platen and adapted to operate said rockable power control device at a predetermined point in said platen retraction to limit the platen retraction, said crank arm being operable by said cam carried by the unit and at a predetermined point in said platen retraction to rock said shaft and move said plunger and ejector against the resistance of said spring means for ejection of a casting from a die supported by the said shiftable platen, and the adjustment of said unit timing the occurrence of said ejection in the platen retraction and determining the limit of said retraction.

5. In a molding machine, the combination of two die-supporting platens one mounted for shifting toward and retraction from the other, power means for advancing and retracting said shiftable platen, an ejector device carried by said shiftable platen, operating means for said device also carried by said shiftable platen, a unit comprising a support, power control means and an ejector-operating trip secured to said support against displacement relatively to each other in the direction of said platen advance and retraction, means for adjusting said unit along the line of said platen advance and retraction, to thereby adjust said power control means and trip along said line in unison and to the same extent while maintaining them in their fixed positions with relation to each other, and a power control trip mounted to travel with said shiftable platen, said ejector-operating means being engageable with said ejector-operating trip and operable thereby upon said platen retraction to a predetermined point to cause ejection of a casting from a die supported by the shiftable platen, said power control trip being engageable with said power control means to operate the latter upon said platen retraction to a predetermined point, whereby the adjustment of said unit determines the limit of platen retraction and the occurrence of said ejection while maintaining the timed relation of the platen stroke limit and the ejection operation in all adjustments of the said unit.

6. In a molding machine, the combination of two die-supporting platens one of said platens being shiftably mounted, power means for advancing the shiftable platen toward and retracting it from the other platen, an ejector device and operating means for said device, a unit comprising a body, a cam borne by said body in a fixed position thereon and an electric switch for control of said power means also borne by said body and secured in a fixed position thereon and including a shiftable operating member, a fixed support for said unit, means for adjusting said unit on said support along the line of said platen advance and retraction, the adjustment of the unit shifting said cam and switch in unison and to the same extent along said line, and a trip mounted to travel with said shiftable platen, said ejector-operating means being engageable with said cam of the unit and operable thereby upon said platen retraction to cause ejection of a casting from a die supported by one of said platents, said trip being engageable with said switch-operating member to operate the switch upon said platen retraction for limiting retraction, and the adjustment of said unit determining said limit and timing the occurrence of said ejection.

7. In a molding machine, the combination of two die-supporting platens one of said platens being shiftably mounted, power means for advancing the shiftable platen toward and retracting it from the other platen, an ejector device and operating means therefor carried by the shiftable platen, a unit comprising a body, a cam borne by said body in a fixed position thereon, an electric switch for control of said power means also borne by said body and secured in a fixed position thereon and including a shiftable operating member, a fixed support for said unit, means for adjusting said unit on said support along the line of said platen advance and retraction, the adjustment of the unit shifting said cam and switch in unison and to the same extent along said line while maintaining them in their fixed positions with relation to each other, and a switch-operating trip mounted to travel with said shiftable platen, said ejector-means being engageable with said cam of the unit and operable thereby upon said platen retraction to cause ejection of a casting from a die supported by said shiftable platen, and said trip being engageable with said switch-operating member to operate the switch upon said platen retraction for limiting said retraction, and the adjustment of said unit determining said limit and timing the occurence of said ejection.

RICHARD W. DINZL.